US008243197B2

(12) United States Patent
Seong et al.

(10) Patent No.: US 8,243,197 B2
(45) Date of Patent: Aug. 14, 2012

(54) METHOD OF PROVIDING USER INTERFACE WHICH IMPLEMENTS SCREEN CONVERSION BY CHANNEL CHANGE IN THREE-DIMENSIONAL EFFECT, AND APPARATUS THEREOF

(75) Inventors: Ki-ae Seong, Seoul (KR); Sung-woo Kim, Seongnam-si (KR); Yong-hwan Kwon, Seongnam-si (KR); Keum-Koo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1609 days.

(21) Appl. No.: 11/655,246

(22) Filed: Jan. 19, 2007

(65) Prior Publication Data

US 2007/0195197 A1    Aug. 23, 2007

(30) Foreign Application Priority Data

Feb. 22, 2006 (KR) ........................ 10-2006-0017347

(51) Int. Cl.
*H04N 5/44* (2006.01)
*H04N 5/50* (2006.01)
(52) U.S. Cl. .................. 348/569; 348/731; 348/564
(58) Field of Classification Search .......... 348/731–733, 348/563–570, 553, 581–583, 734, 584, 588; 345/327–328, 348, 349, 350, 351, 355, 976; 725/39–43; *H04N 5/44, 5/50*
See application file for complete search history.

(56) References Cited

U.S. PATENT DOCUMENTS

| 5,973,691 | A | * | 10/1999 | Servan-Schreiber | 715/803 |
| 6,094,237 | A | * | 7/2000 | Hashimoto | 348/731 |
| 6,147,714 | A | | 11/2000 | Terasawa et al. | |
| 6,384,869 | B1 | * | 5/2002 | Sciammarella et al. | 348/564 |
| 7,607,150 | B1 | * | 10/2009 | Kobayashi et al. | 725/41 |

FOREIGN PATENT DOCUMENTS

| CN | 1350748 A | 5/2002 |
| JP | 2005-012433 A | 1/2005 |
| KR | 1997-0057278 A | 7/1997 |
| KR | 10-2001-0039389 A | 5/2001 |
| KR | 10-2003-0067990 A | 8/2003 |
| KR | 10-2004-00988852 A | 11/2004 |
| WO | WO 98/56176 A1 | 12/1998 |

* cited by examiner

*Primary Examiner* — Trang U Tran
(74) *Attorney, Agent, or Firm* — Sughrue Mion, PLLC

(57) ABSTRACT

A method and an apparatus for providing a user interface which implements screen conversion by channel change in a three-dimensional view, are provided. The method includes receiving a signal for converting a screen into a screen of a first channel, calculating the relationship according to a channel order between the first channel and a second channel that is currently being broadcasted, outputting a portion of broadcasting images of the first channel to a region where broadcasting images of the second channel are output, according to the calculated result, and outputting all the broadcasting images of the first channel.

23 Claims, 9 Drawing Sheets

METHOD OF PROVIDING USER INTERFACE WHICH IMPLEMENTS SCREEN CONVERSION BY CHANNEL CHANGE IN THREE-DIMENSIONAL EFFECT, AND APPARATUS THEREOF

CROSS REFERENCE TO RELATED APPLICATION

This application claims priority from Korean Patent Application No. 10-2006-0017347 filed on Feb. 22, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to a user interface upon channel change, and more particularly, to providing a user interface which implements screen conversion by channel change in a three-dimensional view.

2. Description of the Related Art

As digital broadcasting becomes more widespread, the number of viewing channels has also increased. However, for DMB broadcasts, a long duration of time is required to change or convert a channel while viewing a broadcast. Even though the number of channels has increased, changing a channel depends on the existing screen conversion, which cannot provide a visual display effect in-most cases. In particular, when a screen is simply changed, the user may not know which channel has been selected or how to change the channel, which makes it inconvenient for the user in view of a recent broadcasting trend that offers a variety of programs through a number of channels.

Accordingly, for improved user convenience, a technique for visually providing screen conversion when changing a channel is needed. Further, a technique for easily selecting channels from a number of channels, such that a user may search for a desired channel more accurately, is also needed.

SUMMARY OF THE INVENTION

An aspect of the present invention is to provide a method in which a user can easily change a channel to a desired channel in multi-channel broadcasting.

Another aspect of the present invention is to provide a method in which channel change is mapped with a three-dimensional shape and thus a user can readily notice whether a channel change has occurred.

Aspects of the present invention are not limited to the above-mentioned aspects, and other aspects of the present invention will be apparently understood by those skilled in the art through the following description.

According to an aspect of the present invention, there is provided a method of providing a user interface which implements screen conversion by channel change in a three-dimensional view. The method includes receiving a signal for converting a screen into a screen of a first channel, calculating the relationship according to a channel order between the first channel and a second channel that is currently being broadcasted, outputting a portion of broadcasting images of the first channel to a region where broadcasting images of the second channel are output, according to the calculated result, and outputting all of the broadcasting images of the first channel.

According to another aspect of the present invention, there is provided an apparatus for providing a user interface which implements screen conversion by channel change in a three-dimensional view. The apparatus includes a broadcasting receiving unit receiving broadcasting images, a signal receiving unit receiving a signal for converting a screen into a screen of a first channel, a control unit calculating the relationship according to a channel order between the first channel and a second channel that is currently being broadcasted, and an output unit outputting a portion of broadcasting images of the first channel to a region where broadcasting images of the second channel are output, according to the calculated result, and outputting all of the broadcasting images of the first channel after a predetermined time passes.

BRIEF DESCRIPTION OF THE DRAWINGS

The above and other features of the invention will become more apparent by describing in detail exemplary embodiments thereof with reference to the attached drawings, in which.

DESCRIPTION OF THE EXEMPLARY EMBODIMENTS

Aspects and features of the present invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the invention will only be defined by the appended claims and their equivalents. Same numeric references refer to analogous elements throughout the specification.

The exemplary embodiments of the present invention will now be described more fully with reference to the accompanying drawings, in which exemplary embodiments of the invention are shown. It is to be understood that blocks in the accompanying block diagrams and compositions of operations in flow charts can be performed by computer program instructions. These computer program instructions can be provided to processors of, for example, general-purpose computers, special-purpose computers, and programmable data processing apparatuses. Therefore, the instructions performed by the computer or the processors of the programmable data processing apparatus generate means for executing functions described in the blocks in block diagrams or the operations in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Also, the computer program instructions can be loaded onto the computer or the computer programmable data processing apparatus. Therefore, a series of operations is performed in the computer or the programmable data processing apparatus to generate a process executed by the computer, which makes it possible for the instructions driving the computer or the programmable data processing apparatus to provide operations of executing the functions described in the blocks of the block diagrams or the operations of the flow charts.

In addition, each block or each operation may indicate a portion of a module, a segment or a code including one or more executable instructions for performing a specific logical function (or functions). It should be noted that, in some modifications of the present invention, the functions described in the blocks or the operations may be generated out of order. For example, two blocks or operations continuously shown can be actually performed at the same time, or they can be performed sometimes in reverse order according to the corresponding functions.

Figure 1:
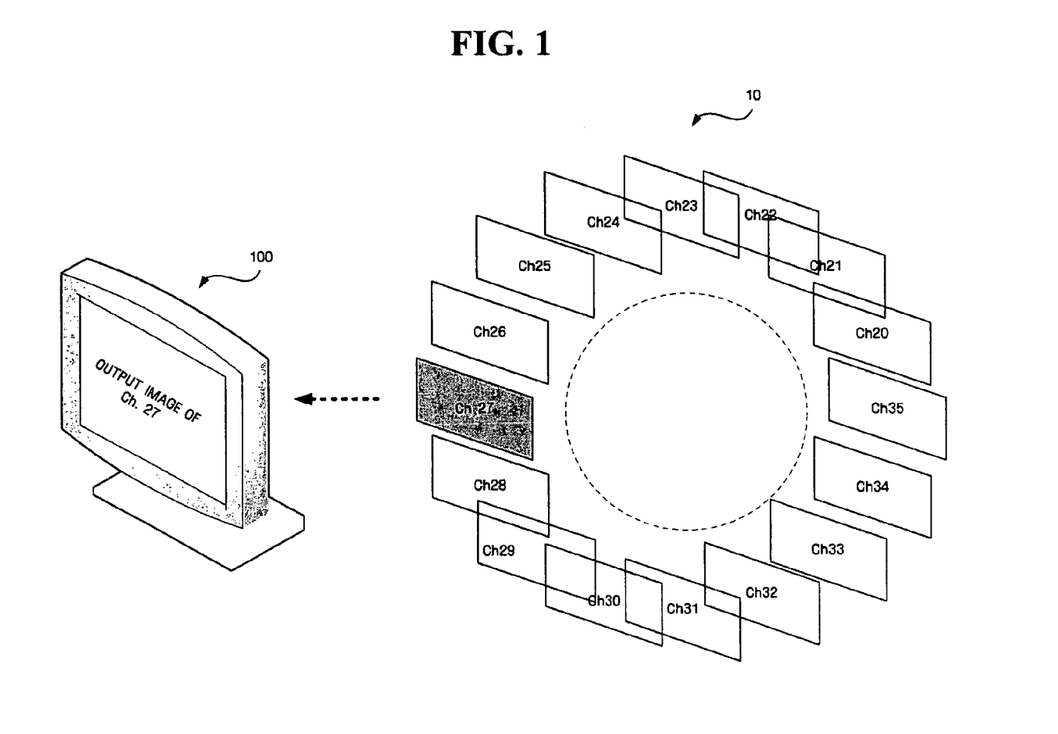
FIG. 1 is a diagram illustrating a map of channels according to an exemplary embodiment of the present invention in a three-dimensional shape.

FIG. 1 is a diagram illustrating a map of a channel according to an exemplary embodiment of the present invention in a three-dimensional shape. As indicated by reference numeral 10, internal channel arrangement is constructed in a circular shape, and the channels may move in up and down directions. A currently broadcasted channel is a channel 27 (hereinafter, a channel is simply referred to as Ch.), and if a user presses on ± keys to change the channel, the current channel may be changed to Ch. 26 or Ch. 28. In FIG. 1, the channel keys are arranged in a circular type in a lengthwise direction such that the channels can be changed in up and down directions. However, the channels may be arranged in a circular type in a widthwise direction such that the channels can be changed in right and left directions.

According to an exemplary structure shown in FIG. 1, when the user changes the channel, if a screen of the Ch. 27 that is currently being broadcasted is changed to a screen of the Ch. 26, it is possible to provide an effect that the screen of the Ch. 26 descends. In contrast, when the user changes the screen of the current channel (Ch. 27) to a screen of a Ch. 28, it is possible to provide an effect that the screen of the Ch. 28 ascends. A broadcasting image that is supplied by the changed channel is output from a display apparatus 100.

Figure 2:
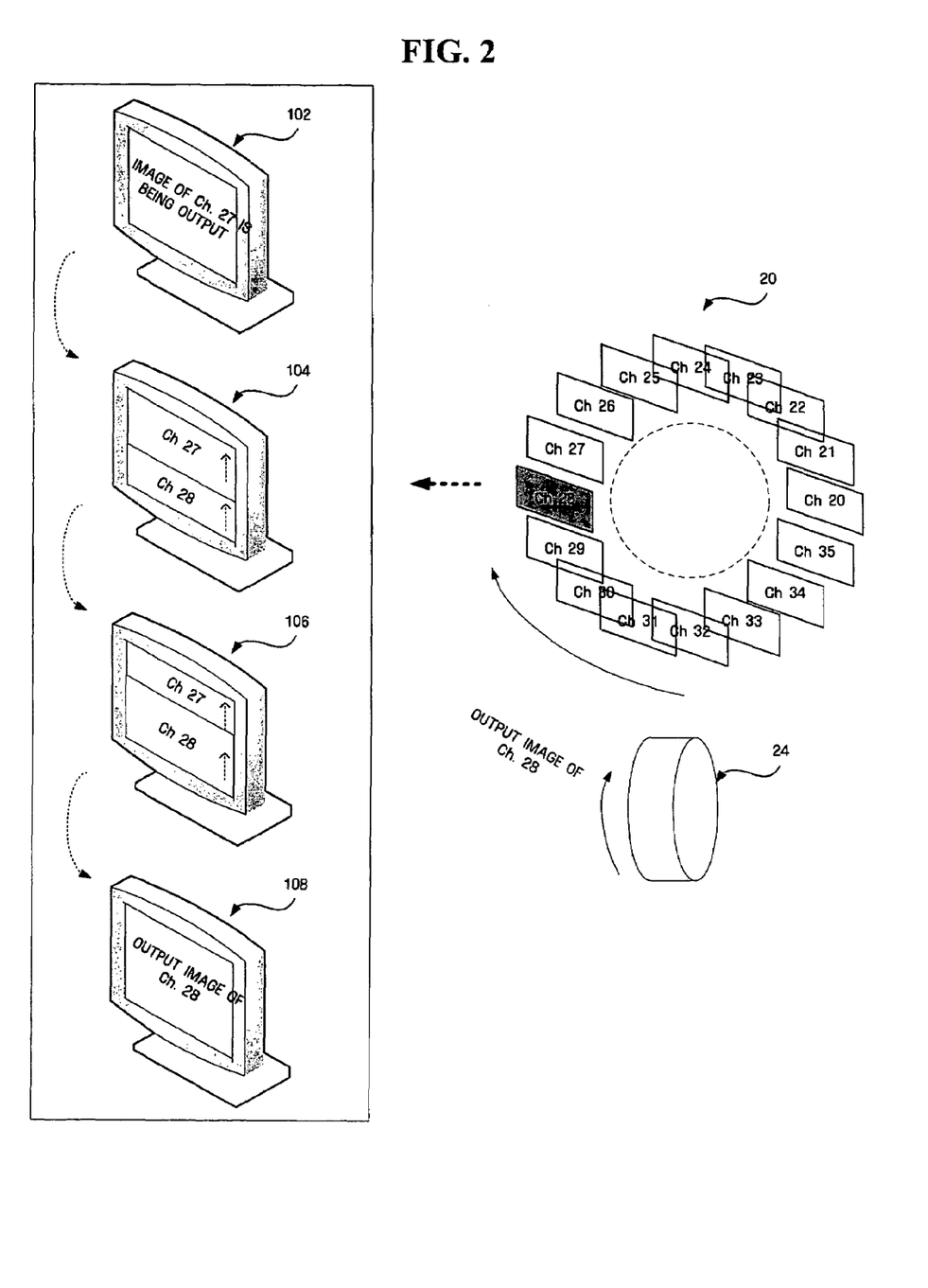
FIG. 2 is a diagram illustrating a case where a channel change according to an exemplary embodiment of the present invention is generated.

FIG. 2 is a diagram illustrating a case where a channel change according to an exemplary embodiment of the present invention is generated. FIG. 2 shows a case where the user changes the channel by converting the Ch. 27 that is currently being broadcasted into the Ch. 28 while the Ch. 27 is being broadcasted, as shown in FIG. 1. At this time, the channel change is made, when a wheel 20 rotates where the channels are arranged. Since the Ch. 28 is located below the Ch. 27 in the wheel 20, it is possible to provide an effect such that an image of the Ch. 28 ascends. The rotation of the wheel 20 is indicated by reference numeral 24.

The screen conversion is made according to the order of screens indicated by reference numerals 102, 104, 106, and 108. While an image of the Ch. 27 is being output as indicated by reference numeral 102, if the user changes the Ch. 27 to the Ch. 28, a partial image of the Ch. 28 ascends from a lower end of the display as indicated by reference numeral 104. Then, while the image of the Ch. 28 and the image of the Ch. 27 share a region on the screen of the display for a predetermined time, a range of the screen of the display occupied by the image of the Ch. 28 expands as indicated by reference numeral 106, and then only the image of the Ch. 28 is output as indicated by reference numeral 108. When the user changes the channel, the user can visually recognize the screen conversion by observing the image of the Ch. 28 ascending from the lower end of the Ch. 27.

The image of the Ch. 28 may ascend to overlap the image of the Ch. 27, and the image of the Ch. 27 may be pushed by the image of the Ch. 28 to ascend, which may depend on a type of implementation.

Figure 3:
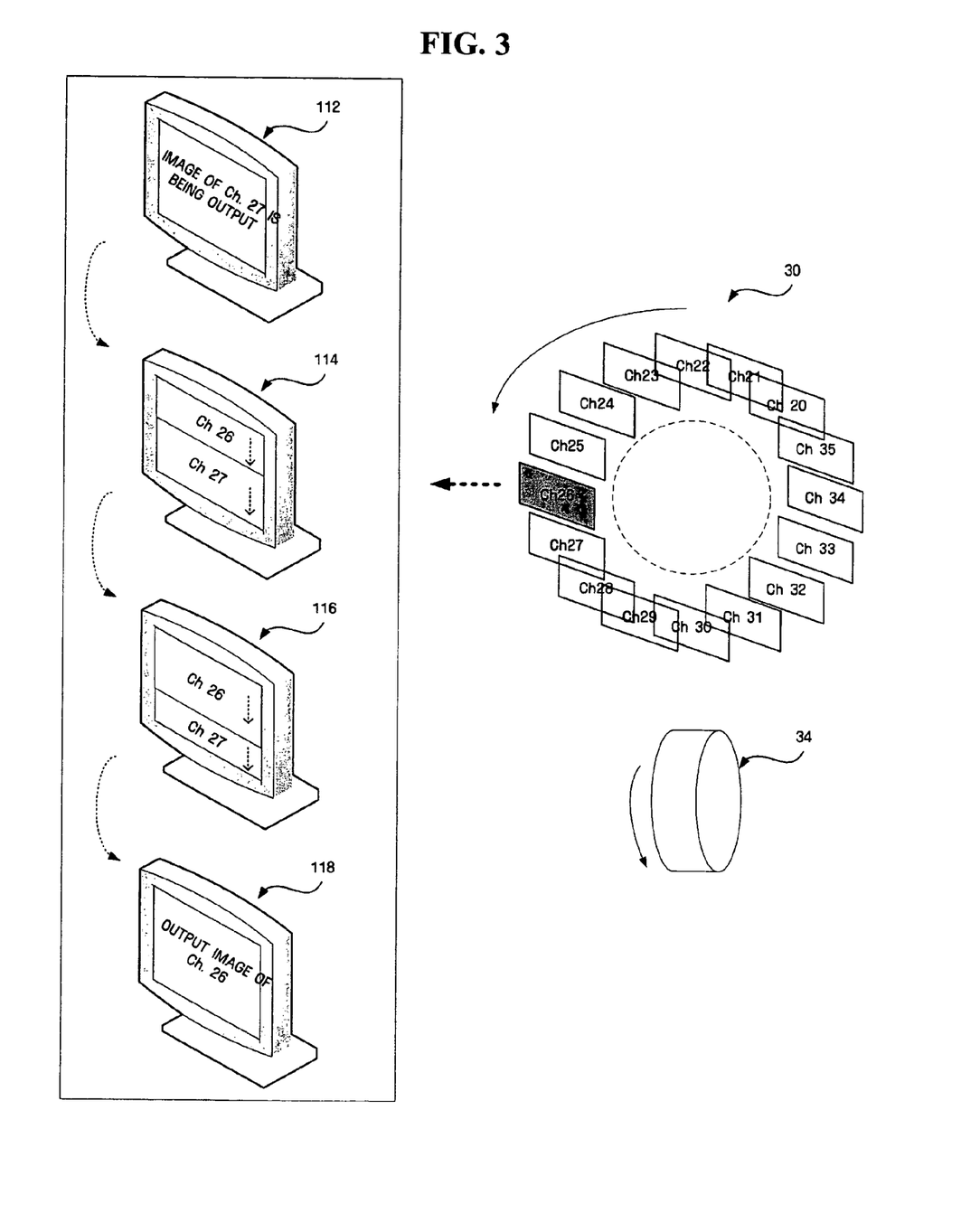
FIG. 3 a diagram illustrating a case where a channel change according to another exemplary embodiment of the present invention is generated.

FIG. 3 is a diagram illustrating a case where a channel change according to another exemplary embodiment of the present invention is generated. As opposed to FIG. 2, FIG. 3 shows a case where a channel selected by the user descends from an upper side. FIG. 3 shows a case where the user changes channel by converting the Ch. 27 that is currently being broadcasted into the Ch. 26 while the Ch. 27 is being broadcasted as shown in FIG. 1. At this time, the channel change is made, when a wheel 30 rotates where the channels are arranged. Since the Ch. 26 is located above the Ch. 27 in the wheel 30, it is possible to provide an effect such that an image of the Ch. 26 descends from an upper side. The rotation of the wheel 30 is indicated by reference numeral 34.

The screen conversion is made according to the order of screens indicated by reference numerals 112, 114, 116, and 118. While an image of the Ch. 27 is being output as indicated by reference numeral 112, if the user changes the Ch. 27 to the Ch. 26, a partial image of the Ch. 26 descends from an upper end of the display as indicated by reference numeral 114. Then, while the image of the Ch. 26 and the image of the Ch. 27 share a region on the screen of the display for a predetermined time, a range of the screen of the display occupied by the image of the Ch. 26 expands as indicated by reference numeral 116, and then only the image of the Ch. 26 is output as indicated by reference numeral 118. When the user changes the channel, the user can visually recognize the screen conversion by observing the image of the Ch. 26 descending from the upper end of the Ch. 27.

In FIG. 3, the image of the changed channel overlaps the image of the channel that is currently being broadcasted. However, the image of the channel that is currently being broadcasted may be pushed by the image of the changed channel to be moved outside the screen.

Figure 4:
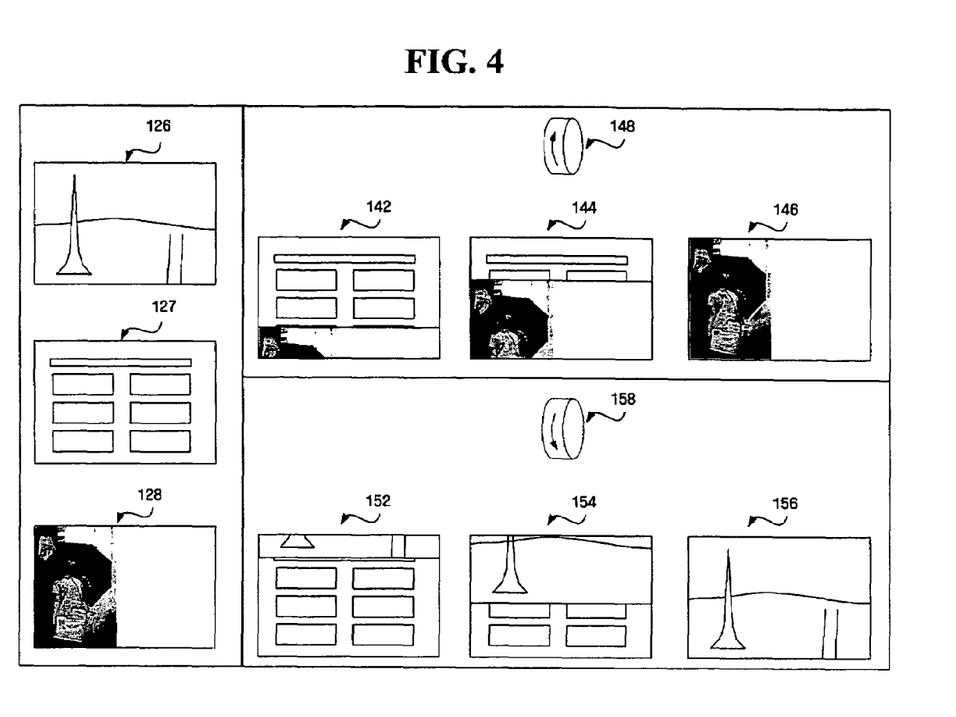
FIG. 4 is a diagram illustrating an example where screens shown in FIGS. 2 and 3 are converted according to an exemplary embodiment of the present invention.

FIG. 4 is a diagram illustrating an example where the screens shown in FIGS. 2 and 3 are converted. In FIG. 4, a currently broadcasted channel 127 is a Ch. 27. A Ch. 26 (126) and a channel 28 (128) are adjacent to the Ch. 27.

Similar to FIG. 2, FIG. 4 shows a case where the user changes the current channel to the Ch. 28. The image 128 that is currently being broadcasted in the Ch. 28 starts to be output at an upper side of the image that is being broadcasted in the Ch. 27. In a screen indicated by a reference numeral 142, a partial image of the Ch. 28 is output to a lower end, and in a screen indicated by a reference numeral 144, a partial image of the Ch. 28 occupies two thirds of the screen. If the channel change is completed, only the broadcasting image of the Ch. 28 is output as indicated by a reference numeral 146. A reference numeral 148 indicates an effect that is given to a user when the channel is changed. Therefore, the user can recognize that a wheel composed of a plurality of channels moves upward.

Meanwhile, similar to FIG. 3, focusing on a case where the user changes the Ch. 27 to the Ch. 26, the image 126 that is being broadcasted in the Ch. 26 starts to be output at an upper side of the image that is being broadcasted in the Ch. 27. In a screen indicated by a reference numeral 152, a partial image of the Ch. 26 is outputted to an upper end of the screen, and in a screen indicated by a reference numeral 154, and a partial image of the Ch. 26 occupies two thirds of the screen. If the channel change is completed, only the broadcasting image of the Ch. 26 is output as indicated by a reference numeral 156. A reference numeral 158 indicates an effect that is given to a user when the channel is changed. Therefore, the user can recognize that a wheel composed of a plurality of channels moves downward.

In order to provide the effect shown in FIG. 4, images of channels anterior and posterior to the currently output channel may be buffered for a predetermined time. When a channel changing signal is generated without buffering the channels anterior and posterior to the currently output channel in advance, images of predetermined channels may be buffered in the corresponding channel changing direction.

Figure 5:
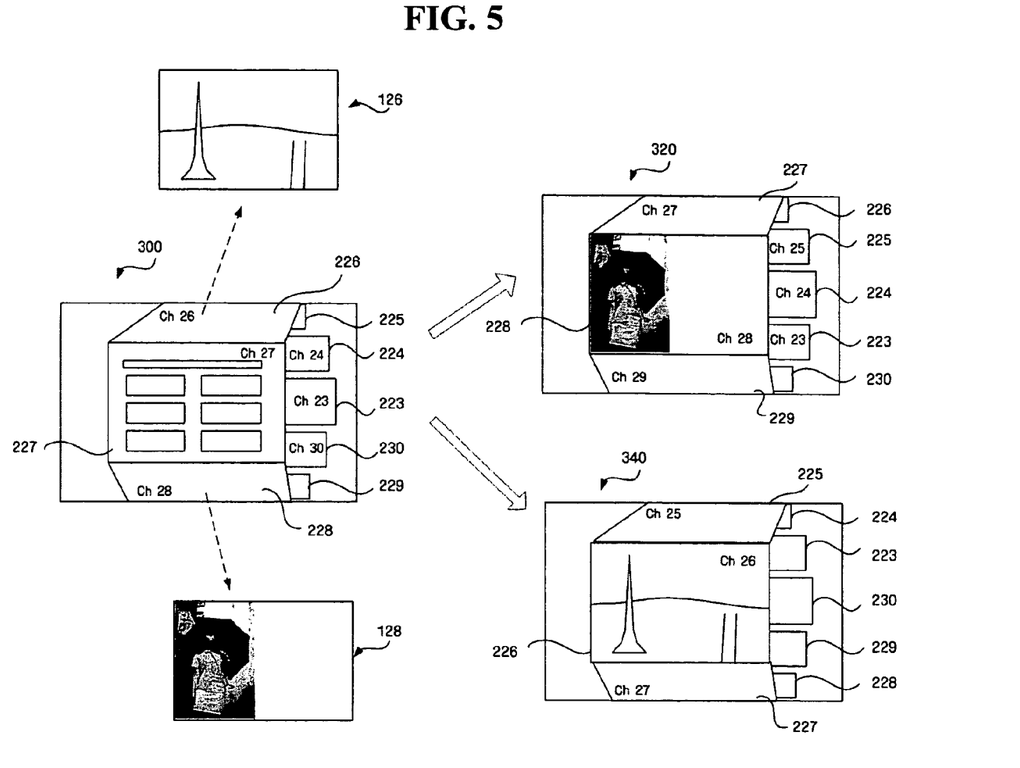
FIG. 5 is a diagram illustrating a case where a screen extends along a Z axis on the basis of a screen shown in FIG. 4 according to an exemplary embodiment of the present invention.

FIG. 5 is a diagram illustrating an example where an image is displayed on a screen in a ring structure when a channel changing signal, according to an exemplary embodiment of the present invention, is continuous.

When the user continuously performs the channel change, for example, the user continually presses on a channel changing button from the channels Ch. 27 to Ch. 30 or from the channels Ch. 27 to Ch. 23, a large amount of time may be necessary for performing the above-described screen conversion. Therefore, unlike the above-described screen conversion, a plurality of channels are displayed in a ring type. It can be made in such a manner that one channel is displayed on a screen or a plurality of channels are displayed on the screen while it appears that the screen moves substantially along a Z axis in a three-dimensional space. Herein, the Z axis is substantially orthogonal to the screen 300.

FIG. 5 shows a case where a screen appears to extend substantially along a Z axis on the basis of the screen shown in FIG. 4 according to an exemplary embodiment of the present invention. A reference numeral 300 shows the screen in a state where the user presses on a channel changing button, and the screen appears to extend substantially along a Z axis to form a plurality of screens.

A broadcasting image 227 of the Ch. 27 is output to a portion of the screen 300. Meanwhile, a broadcasting image 226 of the Ch. 26 is output to an upper side of a region where the broadcasting image 227 of the Ch. 27 is output, and a broadcasting image 228 of the Ch. 28 is output to a lower side of a region where the broadcasting image 227 of the Ch. 27 is output. Since the channels are arranged in a ring type, the broadcasting images 226 and 228 are obliquely output. In this exemplary embodiment, the output broadcasting images 226 and 228 correspond to the broadcasting images 126 and 128 in FIG. 4.

In addition, since all of the broadcasting channels are constructed in a ring type, the broadcasting image 225 of the Ch. 25 is output to the back of the broadcasting image 226 of the Ch. 26, and the broadcasting image 224 of the Ch. 24 is output to the back of the broadcasting image 225 of the Ch. 25. The broadcasting image 223 of the Ch. 23 is output to the location later than the location to which the broadcasting image 224 of the channel 24 is output. The broadcasting images 229 and 230 of the channels Ch. 29 and Ch. 30 are also respectively output at the locations later than the location to which the broadcasting image 228 of the Ch. 28 is output. All the channels are constructed in a circular type or a ring type, and the broadcasting images of the channels Ch. 23, Ch. 24, Ch. 25, Ch. 29, and Ch. 30 that are output at locations later than the broadcasting images of the channels Ch. 26 and Ch. 28 may be output as still images. Also, the broadcasting images of the channels Ch. 26 and Ch. 28 may be output as still images.

When the user changes the current channel (Ch. 27) to the Ch. 28, the broadcasting image of the Ch. 28 is output at the central portion of the screen, as indicated by a reference numeral 320. The broadcasting image 227 of the Ch. 27 that has been output at the central portion of the screen before the broadcasting image of the Ch. 28 is output at the central portion of the screen is located above the broadcasting image of the Ch. 28. This action affects the other channels, and thus the broadcasting image 226 of the Ch. 26 exists at an upper side of the rear side of the screen. Meanwhile, the broadcasting image 229 of the Ch. 29 exists at a lower side of the front side of the screen. As compared with the screen indicated by the reference numeral 300, the screen indicated by the reference numeral 320 takes a type in which a circle or a ring entirely rotates in a backward direction (or upward direction).

In contrast, when the user changes the current channel (Ch. 27) to the Ch. 26, the broadcasting image of the Ch. 26 is output to the central portion of the screen, as indicated by a reference numeral 340. The broadcasting image 227 of the Ch. 27 that is previously output to the central portion of the screen is moved to the lower side of the screen. This motion affects the other channels, and thus the broadcasting image 228 of the Ch. 28 is moved to a lower side of the rear side of the screen. Meanwhile, the broadcasting image 225 of the Ch. 25 is moved to an upper side of the front side of the screen. As compared with the screen indicated by the reference numeral 300, the screen indicated by the reference numeral 340 takes a type in which a circular type or a ring type entirely rotates in a forward direction (or downward direction).

Figure 6:
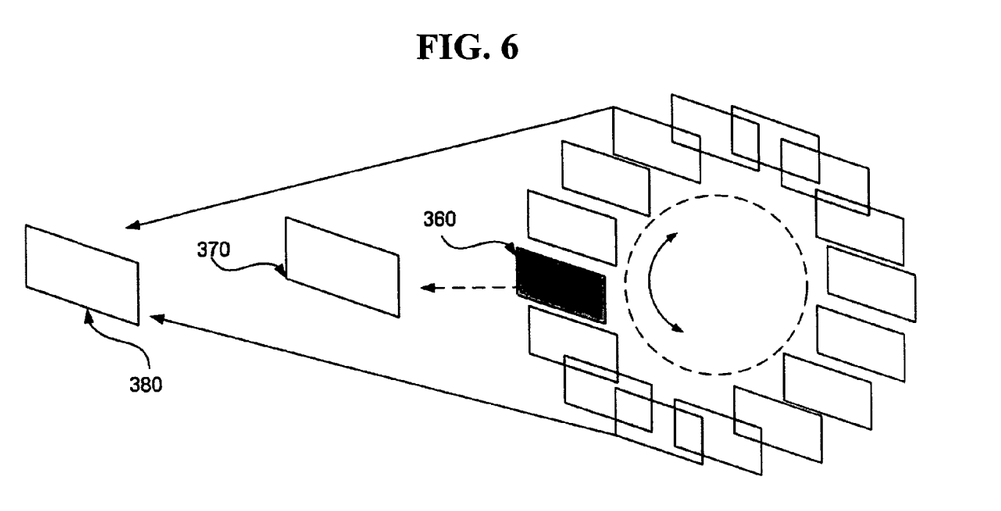
FIG. 6 is a diagram illustrating a case where a screen shown in FIG. 5 moves on the basis of a Z axis in accordance with an exemplary embodiment of the present invention.

FIG. 6 is a diagram illustrating a case where the screen shown in FIG. 5 moves substantially along a Z axis in accordance with the exemplary embodiment of the present invention.

When the user is viewing the broadcast, a broadcasting image 360 of the selected channel is displayed on the screen 370. If the user continuously changes the channel, broadcasting images of a plurality of channels are displayed on the screen as indicated by reference numeral 380, and the user can immediately notice if the channel change has occurred.

Figure 7:
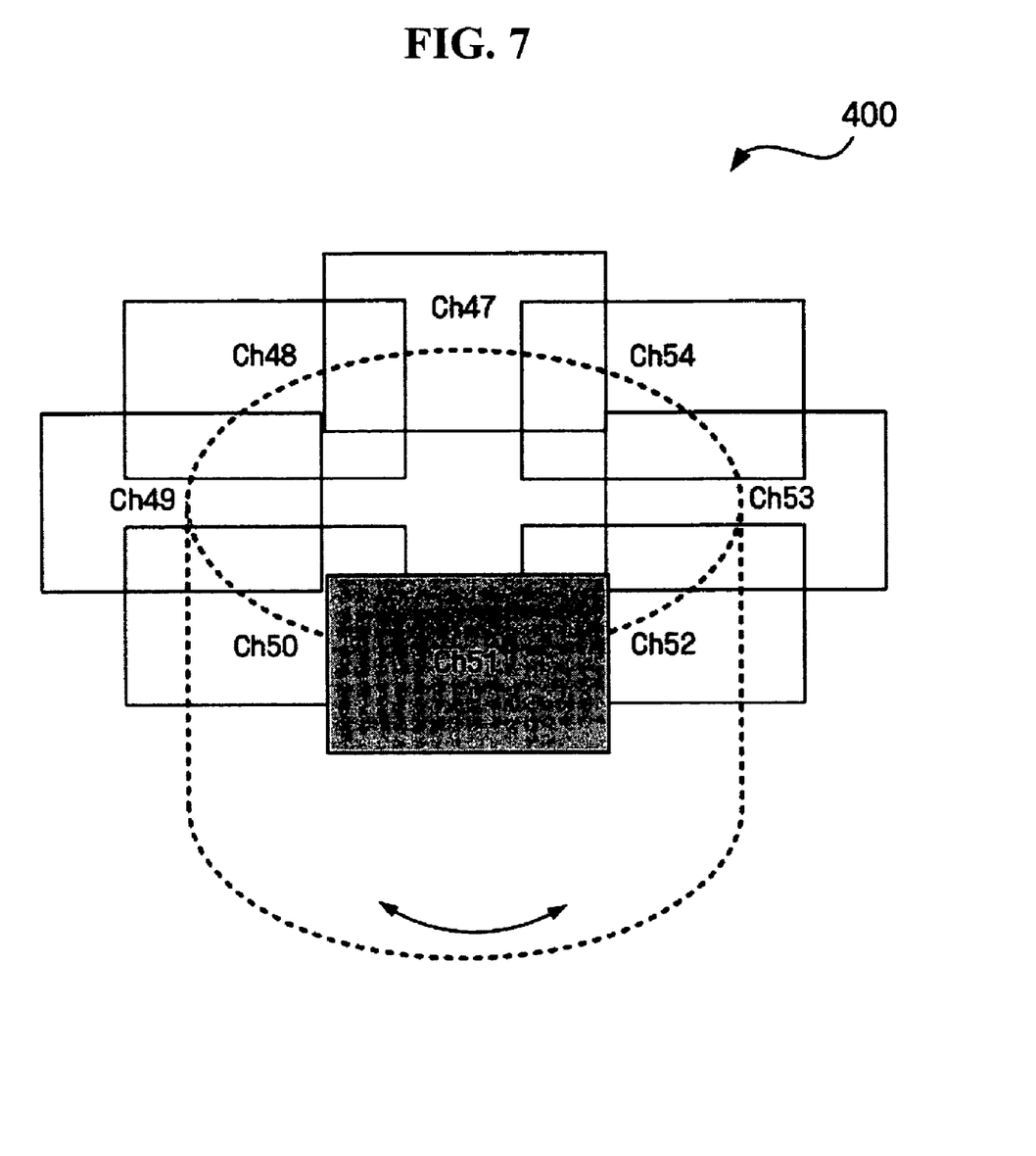
FIG. 7 is a diagram illustrating a case where a screen is converted in a widthwise direction in accordance with an exemplary embodiment of the present invention.

FIG. 7 is a diagram illustrating a case where screen conversion is made in a widthwise direction in accordance with an exemplary embodiment of the present invention. According to the above-described examples, all the channels form a circular type in up and down directions, and the broadcasting images of the channels are moved or converted in up and down directions. The above-described examples can be implemented even in a case where the channels form a circular type in a widthwise direction. The reference numeral 400 indicates a case where the user wants to change the Ch. 51 to the Ch. 50 while viewing the broadcasting image of the Ch. 51. If the user presses on the channel changing button while viewing Ch. 51, the broadcasting image of the Ch. 50 may be output from the left side of the broadcasting image of the Ch. 51 to overlap the broadcasting image of the Ch. 51.

Figure 8:
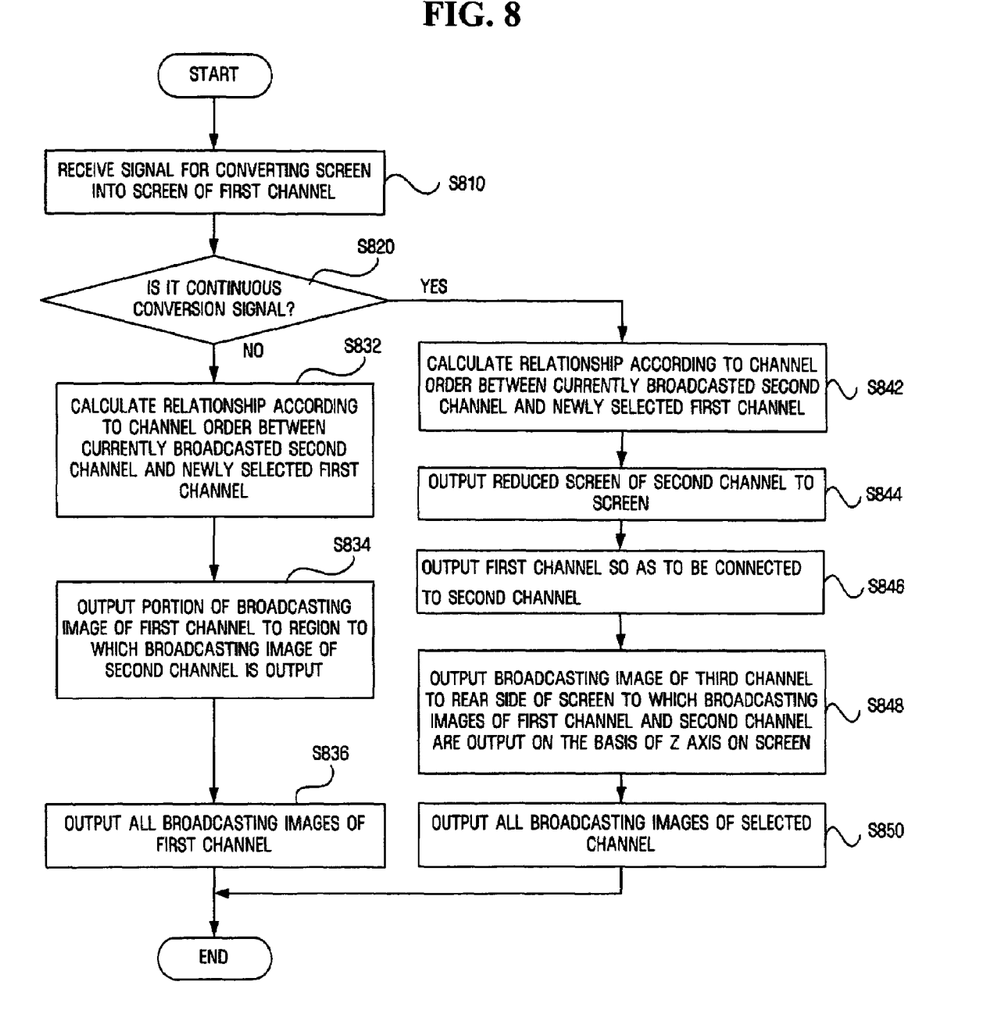
FIG. 8 is a flowchart illustrating a process of a channel being changed in accordance with an exemplary embodiment of the present invention.

FIG. 8 is a flowchart illustrating a process of channel change according to an exemplary embodiment of the present invention.

A signal for converting the screen of the current channel into a screen of a first channel is received (Operation S810). Screen conversion is generated according to a signal generated by a remote controller of the user or an internal processor. If the generated signal is received, a work for changing the channel and converting the screen starts. At this time, it is checked that the signal is a signal indicating continuous channel conversion or a signal indicating conversion of one channel (Operation S820). If the signal is the signal indicating the continuous channel conversion, the channels may be output in a three-dimensional circular or ring structure substantially along a Z axis, as shown in FIGS. 5 and 6.

If the signal is not the signal indicating the continuous channel conversion, the relationship according to the channel order between the second channel to be currently broadcasted and the first channel which the user wants to view is calculated (Operation S832). That is, it is calculated whether the second channel is a channel anterior to the first channel or a channel posterior to the first channel. According to the calculated result, a portion of the broadcasting image of the first channel is output to a region where the broadcasting image of the second channel is output (Operation S834). An example of which has been described with reference to FIGS. 2 and 4. As a method of outputting a portion of the image, the broadcasting image of the first channel may be output in up and down directions or right and left directions of the second channel, and may be output to overlap the broadcasting image of the second channel. Alternatively, the broadcasting image of the first channel may be output in up and down directions or right and left directions of the second channel, and a portion of the broadcasting image of the second channel may disappear on the screen according to the output of the first channel. That is, it is possible to provide an effect that the currently output broadcasting image of the second channel is pushed by the broadcasting image of the first channel to thus disappear.

Meanwhile, when a third channel exists between the first channel and the second channel, a portion of a broadcasting image of the third channel is output to a region to which the broadcasting image of the second channel is output, and the first channel may be subsequently output.

In Operation S834, after applying the channel conversion to the screen conversion in a three-dimensional view, all the broadcasting images of the first channel are output (Operation S836).

In Operation S820, when the signal is recognized as the signal indicating continuous channel conversion, or when the user presses on the channel changing button a predetermined number of times or for a predetermined period of time, it may be automatically recognized as the continuous conversion signal. At this time, for example, the exemplary embodiments shown in FIGS. 5 and 6 may be implemented. The relationship according to the channel order between the second channel to be currently broadcasted and the first channel in which the user wants to view is calculated (Operation S842). Then, the reduced screen of the second channel is displayed on the screen (Operation S844), such that the user views in a three-dimensional view by substantially along the Z axis and the channels are constructed in a three-dimensional type. Then, the first channel is output to be connected to the second channel (Operation S846). According to an exemplary embodiment of the present invention, the channels are output in a circular or ring type. The broadcasting image of the third channel is output to the rear side of the screen to which the broadcasting images of the first channel and the second channel are output on the basis of a Z axis on the screen (Operation S848). It means that the broadcasting images of other channels other than the first channel and the second channel are output to the rear side of the screen in a ring type. Then, if the user stops the channel change and selects the specific channel, all the broadcasting images of the selected channel are output (Operation S850).

After Operation S848, the screen conversion signals may be continuous, and the locations of the broadcasting images of the channels that are output in a circular or ring type may be changed according to the screen conversion signals.

In addition, in order to increase the process speed, the broadcasting images of the channels, which are adjacent to the currently broadcasted channel, may be stored in advance.

Figure 9:
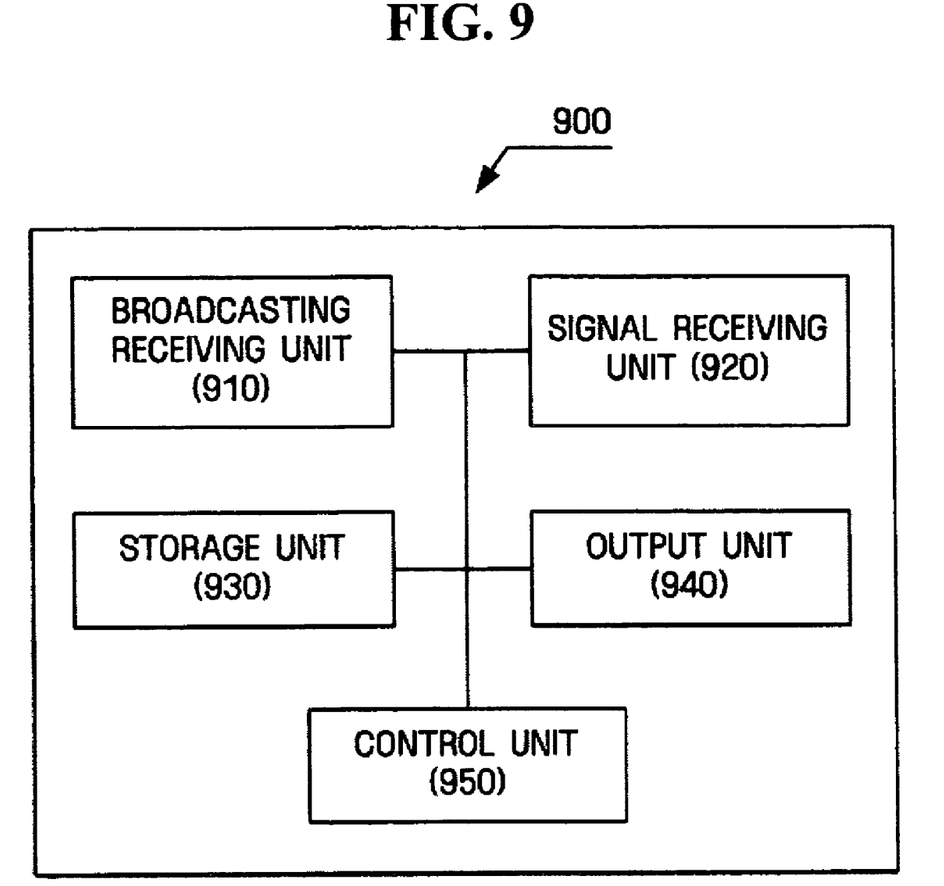
FIG. 9 is a diagram illustrating a structure of an apparatus for providing a user interface according to an exemplary embodiment of the present invention.

FIG. 9 is a diagram illustrating a structure of an apparatus for providing a user interface according to an exemplary embodiment of the present invention.

Meanwhile, the term "unit" used in the exemplary embodiments, that is, "module" or "table" means software, or a hardware component such as an FPGA (Field Programmable Gate Array) or an ASIC (Application Specific Integrated Circuit) and the modules each perform assigned functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and or modules may be separated into additional components and modules. In addition, the components and the modules may be configured to execute at least one CPU in a device.

The apparatus for providing a user interface 900, which implements screen conversion by channel change in a three-dimensional view, may be a display, such as a digital TV, a digital broadcasting receiver, or the like, which outputs broadcasting, or an apparatus on which a broadcasting receiver is mounted. Examples of the apparatus for providing a user interface 900, which implements screen conversion by channel change in a three-dimensional view, may include digital apparatuses, such as notebook computers, computers, PDAs, HPCs, and PMPs, which provide a function for receiving DMB broadcasting.

The broadcasting receiving unit 910 receives a broadcasting image. The broadcasting receiving unit 910 can receive the broadcasting image through a tuner, and may be coupled with another broadcasting receiving apparatus to which a tuner is attached. The broadcasting receiving unit 910 is not limited to the tuner, and has a function of receiving a broadcasting image through a receiver like the tuner. The signal receiving unit 920 receives a signal indicating channel change. If the user controls a remote controller, the channel changing signal may be generated, and it may also be generated by an internal timer. If the user receives a signal instructing to change the current channel to the first channel, the control unit 950 calculates the relationship according to the channel order between the second channel that is currently being broadcasted and the first channel. The control unit 950 calculates whether the first channel is a channel anterior to the second channel or a channel posterior to the second channel. Then, according to the calculated result, the output unit 940 outputs a portion of the broadcasting image of the first channel to a region where the broadcasting image of the second channel is output, and after a predetermined time, the output unit 940 outputs all the broadcasting images of the first channel. Through the time intervals, as described above, a three-dimensional effect can be provided in which the broadcasting images of the two channels overlap each other or the broadcasting image of the currently broadcasted channel is pushed by the broadcasting image of the subsequent channel to then disappear. In order to perform high-speed data processing, the storage unit 930 may store images of the channels adjacent to the currently broadcasted channel in advance.

When the signal receiving unit receives a signal indicating continuous channel changing, the output unit 940 can arrange the channels in a circular type with respect to a Z axis of the screen.

Although the invention has been described in connection with the exemplary embodiments of the invention, it will be apparent to those skilled in the art that various modifications and changes may be made thereto without departing from the scope and spirit of the invention. Therefore, it should be understood that the above embodiments are not limitative, but illustrative in all aspects.

According to the apparatus for providing a user interface which implements screen conversion by channel change in a three-dimensional effect and the method of providing the same according to an exemplary embodiment of the present invention, the user can quickly change the channel to a desired channel by using a remote controller or the like.

According to the apparatus for providing a user interface which implements screen conversion by channel change in a three-dimensional effect and the method of providing the same according to an exemplary embodiment of the invention, the screen conversion can be made according to the channel relationship between the channels that are constructed in a three-dimensional type by the selected channel. As a result, convenience can be provided to the user such that the user can immediately notice if the screen is changed.

What is claimed is:

1. A method of providing a user interface which implements screen conversion by channel change in a three-dimensional view, the method comprising:
   receiving a signal for converting a screen into a screen of a first channel;
   calculating a relationship according to a channel order between the first channel and a second channel that is currently being displayed;
   outputting a portion of images of the first channel to a region where images of the second channel are output, according to the calculated relationship; and
   outputting the images of the first channel and not the images of the second channel,
   wherein if the received signal for converting is a continuous channel changing signal, changing to a different interface from a current interface for the channel changing signal.

2. The method of claim 1, wherein the outputting the portion of the images of the first channel comprises outputting images of the first channel in up and down directions or right and left directions of the second channel so as to overlap the images of the first channel with the images of the second channel.

3. The method of claim 1, wherein the outputting the portion of the images of the first channel comprises outputting images of the first channel in up and down directions and right and left directions of the second channel, such that a portion of images of the second channel disappears from the screen according to the output of the first channel.

4. The method of claim 1, wherein prior to the outputting the portion of the images of the first channel, the method further comprises outputting a portion of images of a third channel to a region where images of the second channel are output, if the third channel exists between the first channel and the second channel.

5. The method of claim 1, wherein prior to the outputting the portion of the images of the first channel, the method further comprises outputting the first channel, the second channel, and a third channel in a three-dimensional circular type view according to a channel order among the first channel, the second channel, and the third channel, if the third channel exists between the first channel and the second channel.

6. The method of claim 1, wherein prior to the receiving the signal for converting the screen into the screen of the first channel, the method further comprises storing in advance the images of the first channel.

7. The method of claim 1, wherein, if the received signal for converting is the continuous channel changing signal, the outputting the portion of the images of the first channel comprises:
   outputting a reduced screen of the second channel to the screen;
   outputting the first channel so as to be connected to the second channel; and
   outputting images of the third channel to a rear side of the screen where images of the first and second channels are output on a front side of the screen, wherein the front and the rear sides appear to be along a direction substantially perpendicular to the screen and wherein the third channel is displayed differently when the channel changing signal is not continuous.

8. The method of claim 7, wherein after the outputting the images of the third channel, the method further comprises:
   receiving a second screen conversion signal; and
   outputting the images of the third channel to locations at which the images of the first and second channels are output.

9. The method of claim 1, wherein, if the received signal for converting signal is the continuous channel changing signal, the outputting the portion of the images of the first channel comprises:
   outputting a reduced screen of the second channel to the screen;
   outputting a third channel so as to be connected to the second channel; and
   outputting the images of the first channel to a rear side of the screen where the images of the second and third channels are output to a front side of the screen, wherein the front and the rear side appear to be along a direction substantially perpendicular to the screen and wherein the third channel is displayed differently when the channel changing signal is not continuous.

10. The method of claim 9, wherein after the outputting the images of the first channel, the method further comprises:
    receiving a second screen conversion signal; and
    outputting the images of the first channel to locations at which the images of the second and third channels are output.

11. The method of claim 1, further comprising identifying the continuous channel changing signal by monitoring a number of times a user requests a channel change in a predetermined period of time, wherein the current interface comprises a two dimensional interface and the different interface comprises a three dimensional interface.

12. The method of claim 1, wherein the current interface displays less channels than the different interface and wherein the current interface displays the channels in a larger size than the different interface.

13. An apparatus for providing a user interface which implements screen conversion by channel change in a three-dimensional view, the apparatus comprising:
- a receiving unit which receives images;
- a signal receiving unit which receives a signal for converting a screen into a screen of a first channel;
- a control unit which calculates a relationship according to a channel order between the first channel and a second channel that is currently being displayed; and
- an output unit which outputs a portion of images of the first channel to a region where images of the second channel are output, according to the calculated relationship, and which outputs the images of the first channel and none of the images of the second channel after a predetermined time,
- wherein if the received signal for converting is a continuous channel changing signal, changing to a different interface from a current interface for the channel changing signal.

14. The apparatus of claim 13, wherein the output unit outputs images of the first channel in up and down directions or right and left directions of the second channel so as to overlap the images of the first channel with the images of the second channel.

15. The apparatus of claim 13, wherein the output unit outputs images of the first channel in up and down directions and right and left directions of the second channel, such that a portion of the images of the second channel disappears on the screen according to the output of the first channel.

16. The apparatus of claim 13, wherein the output unit outputs a portion of images of a third channel to a region where images of the second channel are output, if the third channel exists between the first channel and the second channel.

17. The apparatus of claim 13, wherein the output unit outputs the first channel, the second channel, and a third channel in a three-dimensional circular type view according to a channel order from among the first channel, the second channel, and the third channel, if the third channel exists between the first channel and the second channel.

18. The apparatus of claim 13, further comprising a storage unit, which stores in advance the images of the first channel.

19. The apparatus of claim 13, wherein, if the signal received by the signal receiving unit is the continuous channel changing signal, the output unit outputs a reduced screen of the second channel to the screen, outputs the first channel so as to be connected to the second channel, and outputs images of a third channel to a rear side of the screen where the images of the first and second channels are output on a front side of the screen, wherein the front and the read sides of the screen appear to be along a direction substantially perpendicular to the screen and wherein the third channel is displayed differently when the channel changing signal is not continuous.

20. The apparatus of claim 19, wherein, if the signal receiving unit receives a second screen conversion signal after the output unit outputs the signal of the third channel, the output unit outputs the images of the third channel to locations at which the images of the first and second channels are output.

21. The apparatus of claim 13, wherein, if the signal received by the signal receiving unit is a continuous channel changing signal, the output unit outputs a reduced screen of the second channel to the screen, outputs a third channel so as to be connected to the second channel, and outputs the images of the first channel to a rear side of the screen where images of the second and third channels are output along on a front side of the screen, wherein the front and the read sides of the screen appear to be along a direction substantially perpendicular to the screen.

22. The apparatus of claim 21, wherein, if the signal receiving unit receives a second screen conversion signal after the output unit outputs the images of the first channel, the output unit outputs the images of the first channel to locations at which the images of the second and third channels are output.

23. A method of providing a user interface which implements screen conversion by channel change in a three-dimensional view, the method comprising:
- receiving a signal for converting a screen into a screen of a first channel;
- calculating a relationship according to a channel order between the first channel and a second channel that is currently being displayed;
- displaying a portion of images of the first channel to a region where images of the second channel are displayed, according to the calculated relationship; and
- displaying the images of the first channel and not the images of the second channel,
- wherein if the received signal for converting is a continuous channel changing signal, changing to a different interface from a current interface for the channel changing signal.

* * * * *